(12) United States Patent
Huang et al.

(10) Patent No.: US 12,021,775 B2
(45) Date of Patent: Jun. 25, 2024

(54) SIGNAL TRANSMISSION METHOD AND APPARATUS FOR OBTAINING POSITIONING REFERENCE SIGNAL

(71) Applicant: Huawei Technologies Co., Ltd., Shenzhen (CN)

(72) Inventors: Su Huang, Shanghai (CN); Lei Chen, Chengdu (CN); Yi Wang, Shanghai (CN); Jun Luo, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/390,569

(22) Filed: Jul. 30, 2021

(65) Prior Publication Data

US 2021/0359813 A1 Nov. 18, 2021

Related U.S. Application Data

(63) Continuation of application No. PCT/CN2020/073991, filed on Jan. 23, 2020.

(30) Foreign Application Priority Data

Feb. 1, 2019 (CN) .......................... 201910105775.8

(51) Int. Cl.
*H04L 5/00* (2006.01)
*H04W 16/28* (2009.01)
*H04W 56/00* (2009.01)

(52) U.S. Cl.
CPC ........... *H04L 5/0048* (2013.01); *H04W 16/28* (2013.01); *H04W 56/001* (2013.01)

(58) Field of Classification Search
CPC .... H04L 5/0048; H04W 16/28; H04W 56/001
See application file for complete search history.

(56) References Cited

U.S. PATENT DOCUMENTS

2013/0150013 A1* 6/2013 Liu ........................ H04W 8/183
 455/418
2013/0150014 A1* 6/2013 Gong .................... H04W 48/18
 455/418

(Continued)

FOREIGN PATENT DOCUMENTS

CN 105589506 A 5/2016
CN 107113569 A 8/2017

(Continued)

OTHER PUBLICATIONS

"NR beam management supporting multi-gNB measurements for positioning," 3GPP TSG RAN WG1 Meeting #95, Spokane, US, R1-1813583, Total 8 pages, 3rd Generation Partnership Project, Valbonne, France (Nov. 12-16, 2018).

(Continued)

*Primary Examiner* — Mewale A Ambaye
(74) *Attorney, Agent, or Firm* — Leydig, Voit & Mayer, Ltd.

(57) ABSTRACT

A signal transmission method includes: a terminal device receives configuration information of a positioning reference signal and configuration information of a first reference signal that are from a first network device and that are sent by a serving base station, where the first reference signal and the positioning reference signal are quasi-co-located (QCLed); the terminal device determines, based on the configuration information of the positioning reference signal and the configuration information of the first reference signal, whether a second reference signal corresponding to the first reference signal exists; and if determining that the second reference signal exists, the terminal device receives the positioning reference signal sent by the first network device, where the positioning reference signal and the second reference signal are QCLed.

20 Claims, 5 Drawing Sheets

(56) References Cited

U.S. PATENT DOCUMENTS

| | | | | |
|---|---|---|---|---|
| 2013/0150036 | A1* | 6/2013 | Pattaswamy | H04W 76/15 455/435.1 |
| 2016/0223639 | A1 | 8/2016 | Davydov et al. | |
| 2018/0083680 | A1 | 3/2018 | Guo et al. | |
| 2018/0270784 | A1 | 9/2018 | Lee et al. | |
| 2018/0324727 | A1* | 11/2018 | Zhou | H04W 56/004 |
| 2022/0077981 | A1* | 3/2022 | Duan | G01S 5/02213 |
| 2022/0124672 | A1* | 4/2022 | Xu | H04W 72/23 |
| 2022/0408428 | A1* | 12/2022 | Tian | H04W 72/21 |

FOREIGN PATENT DOCUMENTS

| | | | | |
|---|---|---|---|---|
| CN | 107113771 | A | 8/2017 | |
| CN | 107409267 | A | 11/2017 | |
| CN | 107409286 | A | 11/2017 | |
| CN | 107925496 | A | 4/2018 | |
| CN | 108024274 | A | 5/2018 | |
| CN | 108092754 | A | 5/2018 | |
| CN | 108811074 | A | 11/2018 | |
| JP | 2018528692 | A | 9/2018 | |
| WO | 2016122757 | A1 | 8/2016 | |
| WO | 2018085078 | A1 | 5/2018 | |
| WO | WO-2018085078 | A1 * | 5/2018 | G01S 5/0205 |
| WO | 2018137198 | A1 | 8/2018 | |

OTHER PUBLICATIONS

"Outcome of offline email discussion on Potential Techniques for NR positioning," 3GPP TSG-RAN WG1 #94b, Chengdu, P.R. China, R1-1811993, pp. 1-11, 3rd Generation Partnership Project, Valbonne, France (Oct. 8-12, 2018).

"3rd Generation Partnership Project; Technical Specification Group Radio Access Network; NR; Physical layer procedures for data (Release 15)," 3GPP TS 38.214 V15.4.0, pp. 1-102, 3rd Generation Partnership Project, Valbonne, France (Dec. 2018).

"NG-RAN Positioning Architecture and Procedures," 3GPP TSG-RAN WG2 Meeting #104, Spokane, USA, R2-1817898, pp. 1-17, 3rd Generation Partnership Project, Valbonne, France (Nov. 12-16, 2018).

"3rd Generation Partnership Project; Technical Specification Group Radio Access Network; NR; Radio Resource Control (RRC) protocol specification (Release 15)," 3GPP TS 38.331 V15.4.0, pp. 1-474, 3rd Generation Partnership Project, Valbonne, France (Dec. 2018).

"3rd Generation Partnership Project; Technical Specification Group Radio Access Network; Evolved Universal Terrestrial Radio Access (E-UTRA); LTE Positioning Protocol (LPP) (Release 15)," 3GPP TS 36.355 V15.2.0, pp. 1-220, 3rd Generation Partnership Project, Valbonne, France (Dec. 2018).

"NR RAT-dependent DL Positioning," 3GPP TSG RAN WG1 Ad-Hoc Meeting 1901, Taipei, R1-1900310, pp. 1-19, 3rd Generation Partnership Project, Valbonne, France (Jan. 21-25, 2019).

"Remaining issues on DL based positioning," 3GPP TSG RAN WG1 Meeting #96, Athens, Greece, R1-1901574, Total 8 pages, 3rd Generation Partnership Project, Valbonne, France (Feb. 25-Mar. 1, 2019).

"Considerations on OTDOA in NR," 3GPP TSG-RAN WG2 Meeting #105, Athens, Greece, R2-1901281, Total 3 pages, 3rd Generation Partnership Project, Valbonne, France (Feb. 25-Mar. 1, 2019).

* cited by examiner

SIGNAL TRANSMISSION METHOD AND APPARATUS FOR OBTAINING POSITIONING REFERENCE SIGNAL

CROSS-REFERENCE TO RELATED APPLICATIONS

This application is a continuation of International Application No. PCT/CN2020/073991, filed on Jan. 23, 2020, which claims priority to Chinese Patent Application No. 201910105775.8, filed on Feb. 1, 2019. The disclosures of the aforementioned applications are hereby incorporated by reference in their entireties.

FIELD

This application relates to the communications field, and more specifically, to a signal transmission method and apparatus.

BACKGROUND

A quasi-colocation (QCL) (QCL may also be referred to as quasi-co-location) relationship is introduced in long term evolution (LTE) coordinated multi-point (CoMP). That two reference signals are QCLed on a large-scale parameter indicates that a large-scale parameter of one reference signal can be inferred from a large-scale parameter of the other reference signal, so that a terminal can assist in receiving one reference signal based on receiving information of the other reference signal. In an LTE system, a quasi-colocation QCL relationship configuration of positioning reference signals (PRS) is fixed. An example in which an auxiliary information reference cell of an observed time difference of arrival (OTDOA) is used. When a parameter cpLengthCRS is configured, a terminal device may consider that a cell-specific reference signal (CRS) and a PRS of the auxiliary information reference cell are QCLed. In this way, a time of arrival (TOA) measured by the terminal device based on the CRS may be used to assist in determining the TOA based on the PRS, to calculate a reference signal time difference (RSTD).

However, a QCL configuration of a positioning reference signal PRS in a future fifth generation (5G) system or a new radio (NR) system is not determined. If a terminal device receives a positioning reference signal in a beam sweeping manner, complexity is relatively high, especially when a base station or the terminal device supports a relatively large quantity of beams.

SUMMARY

In view of this, this application provides a signal transmission method and apparatus. Configuration information of a positioning reference signal and configuration information of a first reference signal are sent to a terminal device, to help the terminal device determine a receive beam for the positioning reference signal. This can reduce overheads of performing receive beam sweeping by the terminal device, and save resources.

According to a first aspect, a signal transmission method is provided, including: a terminal device receives configuration information of a positioning reference signal and configuration information of a first reference signal that are from a first network device and that are sent by a serving base station, where the first reference signal and the positioning reference signal are quasi-co-located (QCLed), and the first network device is any one of a plurality of devices configured to position the terminal device; the terminal device determines, based on the configuration information of the positioning reference signal and the configuration information of the first reference signal, whether a second reference signal corresponding to the first reference signal exists; and if determining that the second reference signal exists, the terminal device receives the positioning reference signal sent by the first network device, where the positioning reference signal and the second reference signal are QCLed; or if determining that the second reference signal does not exist, the terminal device receives the positioning reference signal sent by the first network device. This helps the terminal device determine a receive beam for the positioning reference signal, and can reduce overheads of performing receive beam sweeping by the terminal device.

Optionally, that the first reference signal and the positioning reference signal are QCLed includes: the first reference signal and the positioning reference signal are QCLed on one or more of the following parameters: an average delay, a delay spread, a Doppler shift, a Doppler spread, a spatial receive parameter, and an average gain.

Optionally, that the positioning reference signal and the second reference signal are QCLed includes: the positioning reference signal and the second reference signal are QCLed on one or more of the following parameters: an average delay, a delay spread, a Doppler shift, a Doppler spread, a spatial receive parameter, and an average gain.

Optionally, the configuration information of the positioning reference signal includes one or more of the following: a time-frequency resource, a quantity of ports, a periodicity and an offset within the periodicity, and sequence information.

Optionally, if the first reference signal is a synchronization signal block (SSB), the configuration information of the first reference signal includes one or more of the following: a frequency domain resource, a system frame number (SFN) initialization time, a time domain index, a periodicity, and a physical cell identifier.

If the first reference signal is a channel state information reference signal (CSI-RS), the configuration information of the positioning reference signal includes one or more of the following: a time-frequency resource, a periodicity and an offset within the periodicity, and sequence information.

In an implementation, that the terminal device determines, based on the configuration information of the positioning reference signal and the configuration information of the first reference signal, whether a second reference signal corresponding to the first reference signal exists includes: if the positioning reference signal does not belong to a serving cell of the terminal device, the terminal device determines, from a first signal set based on the configuration information of the positioning reference signal and the configuration information of the first reference signal, whether the second reference signal exists, where the first signal set includes one or more of the following: a reference signal of a neighboring cell in a measurement object of the serving cell, a reference signal set of the terminal device configured in the serving cell, and a reference signal configured by a location management function (LMF) for the terminal device. Therefore, even if the positioning reference signal does not belong to the serving cell, the terminal device may determine whether the second reference signal exists in the first signal set.

Optionally, the reference signal set of the terminal device configured in the serving cell includes: a CSI-RS set configured by the serving base station for the terminal device by using a channel state information measurement configuration CSI-MeasConfig. Therefore, the terminal device may obtain the reference signal set from the serving base station.

In an optional embodiment of this implementation, that the terminal device determines that the second reference signal exists in the first signal set includes: if the first reference signal is a synchronization signal block (SSB), the second reference signal is an SSB that is in the first signal set and that meets one or more of the following conditions: having a same subcarrier spacing as the first reference signal, having a resource element overlapping with a resource element (RE) corresponding to the first reference signal, and having a same physical layer cell identifier as the first reference signal. Therefore, if the first reference signal is an SSB, the terminal device may search the first signal set based on the foregoing conditions. If an SSB that meets the conditions is found, it is determined that the second reference signal exists.

In another optional embodiment of this implementation, if the first reference signal is a channel state information reference signal (CSI-RS), the second reference signal is a CSI-RS or a synchronization signal block (SSB) that is in the first signal set and that meets one or more of the following conditions: having a same subcarrier spacing as the first reference signal, having a resource element at least partially overlapping with a resource element (RE) corresponding to the first reference signal, where there is a same sequence on the overlapped RE, having a same physical layer cell identifier as the first reference signal, and having a QCL relationship with the first reference signal. Therefore, if the first reference signal is a CSI-RS, the terminal device may search the first signal set based on the foregoing conditions. If a CSI-RS or an SSB that meets the conditions is found, it is determined that the second reference signal exists.

In another implementation, that the terminal device determines, based on the configuration information of the positioning reference signal and the configuration information of the first reference signal, whether a second reference signal corresponding to the first reference signal exists includes: if the positioning reference signal belongs to a serving cell of the terminal device, the terminal device determines, based on the configuration information of the positioning reference signal and the configuration information of the first reference signal, whether the second reference signal is included in at least one reference signal of the serving cell. Therefore, if the positioning reference signal belongs to the serving cell, the terminal device may determine whether the second reference signal is included in the at least one reference signal of the serving cell.

In an optional embodiment of this implementation, that the terminal device determines that the second reference signal is included in the at least one reference signal of the serving cell includes: if the first reference signal is a synchronization signal block (SSB), the second reference signal is an SSB that is in the at least one reference signal of the serving cell and that has a same time domain resource index as the first reference signal. Therefore, if the first reference signal is an SSB, the terminal device may search the serving cell based on the foregoing conditions. If an SSB that meets the conditions is found, it is determined that the second reference signal exists.

In another optional embodiment of this implementation, that the terminal device determines that the second reference signal is included in the at least one reference signal of the serving cell includes: if the first reference signal is a channel state information reference signal (CSI-RS), the second reference signal is a CSI-RS or a synchronization signal block (SSB) that is in a first signal set and that meets one or more of the following conditions: having a same subcarrier spacing as the first reference signal, having a resource element at least partially overlapping with a resource element (RE) corresponding to the first reference signal, where there is a same sequence on the overlapped RE, and having a QCL relationship with the first reference signal. Therefore, if the first reference signal is a CSI-RS, the terminal device may search the serving cell based on the foregoing conditions. If a CSI-RS or an SSB that meets the conditions is found, it is determined that the second reference signal exists.

Optionally, the configuration information of the positioning reference signal and the configuration information of the first reference signal are sent by a positioning function node to the terminal device via the serving base station. The positioning function node may be deployed in a core network. Therefore, this embodiment of this application may also be applied to a positioning system in which a positioning function node is deployed in a core network.

Optionally, the method further includes: the terminal device sends a positioning report to the serving base station, where the positioning report includes a measurement result of the positioning reference signal, where the positioning reference signal meets conditions: the terminal device receives the configuration information of the first reference signal corresponding to the positioning reference signal, and the terminal device has determined that the second reference signal exists; or the positioning reference signal meets conditions: the terminal device receives the configuration information of the first reference signal corresponding to the positioning reference signal, and the second reference signal has not been determined.

Therefore, if the terminal device receives the configuration information of the first reference signal corresponding to the positioning reference signal and determines that the second reference signal exists, the terminal device may send the positioning report to the serving base station. Alternatively, if the terminal device receives the configuration information of the first reference signal corresponding to the positioning reference signal, and cannot determine the second reference signal, the terminal device may also send the positioning report to the serving base station.

According to a second aspect, a signal transmission method is provided, including: a serving base station determines a plurality of devices configured to position a terminal device; sends, to the terminal device, configuration information of a positioning reference signal and configuration information of a first reference signal that are from a first network device, where the first reference signal and the positioning reference signal are quasi-co-located (QCLed), and the first network device is any one of the plurality of devices configured to position the terminal device. Therefore, the serving base station sends, to the terminal device, the positioning reference signal and a configuration of a reference signal QCLed with the positioning reference signal. This helps the terminal device to determine a second reference signal, helps the terminal device to determine a receive beam for the positioning reference signal, and therefore reduces overheads of performing receive beam sweeping by the terminal device.

Optionally, the method further includes: the serving base station receives a positioning report sent by the terminal device. Further, the serving base station may further send the positioning report sent by the terminal device to a positioning function node, to help the positioning function node to position the terminal device.

Optionally, that a serving base station determines a plurality of devices configured to position a terminal device includes: the serving base station selects, according to an indication of the positioning function node, the plurality of devices configured to position the terminal device. Therefore, the serving base station may select, by itself, devices that are used for positioning the terminal device. Alternatively, the serving base station may receive an indication of the positioning function node, to learn of devices that are used for positioning the terminal device.

Optionally, the configuration information of the positioning reference signal includes one or more of the following: a time-frequency resource, a quantity of ports, a periodicity and an offset within the periodicity, and sequence information.

Optionally, if the first reference signal is a synchronization signal block (SSB), the configuration information of the first reference signal includes one or more of the following: a frequency domain resource, a system frame initialization time, a time domain index, a periodicity, and a physical layer cell identifier.

If the first reference signal is a channel state information reference signal (CSI-RS), the configuration information of the positioning reference signal includes one or more of the following: a time-frequency resource, a periodicity and an offset within the periodicity, and sequence information.

According to a third aspect, a signal transmission method is provided, including: a positioning function node receives configuration information of a positioning reference signal and configuration information of a first reference signal that are reported by a first network device, where the first reference signal and the positioning reference signal are quasi-co-located (QCLed), and the first network device is any one of a plurality of devices configured to position a terminal device; and sends the configuration information of the positioning reference signal and the configuration information of the first reference signal to a serving base station, so that the serving base station sends, to the terminal device, the positioning reference signal and a configuration of a reference signal QCLed with the positioning reference signal. This helps the terminal device to determine a second reference signal, and helps the terminal device to determine a receive beam for the positioning reference signal, and overheads of performing receive beam sweeping by the terminal device can be reduced.

Optionally, the method further includes: the positioning function node receives a positioning report sent by the serving base station.

In an implementation, the method further includes: the positioning function node sends, to the serving base station, configuration information of a positioning reference signal of each network device in a plurality of network devices and configuration information of a reference signal QCLed with the positioning reference signal. Therefore, the positioning function node may further send configurations of positioning reference signals of other network devices to the serving base station, so that the serving base station selects the network devices for positioning the terminal device, and sends configurations of positioning reference signals of the selected network devices to the terminal device.

Optionally, the configuration information of the positioning reference signal includes one or more of the following: a time-frequency resource, a quantity of ports, a periodicity and an offset within the periodicity, and sequence information.

Optionally, if the first reference signal is a synchronization signal block (SSB), the configuration information of the first reference signal includes one or more of the following: a frequency domain resource, a system frame initialization time, a time domain index, a periodicity, and a physical layer cell identifier.

If the first reference signal is a channel state information reference signal (CSI-RS), the configuration information of the positioning reference signal includes one or more of the following: a time-frequency resource, a periodicity and an offset within the periodicity, and sequence information.

According to a fourth aspect, a communication apparatus is provided. The communication apparatus includes a module configured to perform the method according to any one of the first aspect or the possible implementations of the first aspect.

According to a fifth aspect, a communication apparatus is provided. The communication apparatus includes a module configured to perform the method according to any one of the second aspect or the possible implementations of the second aspect.

According to a sixth aspect, a communication apparatus is provided. The communication apparatus includes a module configured to perform the method according to any one of the third aspect or the possible implementations of the third aspect.

According to a seventh aspect, a communication apparatus is provided. The communication apparatus may be the terminal device in the foregoing method designs, or may be a chip disposed in the terminal device. The communication apparatus includes a processor that is coupled to a memory, and the processor may be configured to execute instructions in the memory, to implement the method performed by the terminal device in any one of the first aspect and the possible implementations of the first aspect. Optionally, the communication apparatus further includes the memory. Optionally, the communication apparatus further includes a communication interface, and the processor is coupled to the communication interface.

When the communication apparatus is the terminal device, the communication interface may be a transceiver or an input/output interface.

When the communication apparatus is the chip disposed in the terminal device, the communication interface may be an input/output interface.

Optionally, the transceiver may be a transceiver circuit. Optionally, the input/output interface may be an input/output circuit.

According to an eighth aspect, a communication apparatus is provided. The communication apparatus may be the serving base station in the foregoing method designs, or may be a chip disposed in the serving base station. The communication apparatus includes a processor that is coupled to a memory, and the processor may be configured to execute instructions in the memory, to implement the method performed by the serving base station in any one of the second aspect and the possible implementations of the second aspect. Optionally, the communication apparatus further includes the memory. Optionally, the communication apparatus further includes a communication interface, and the processor is coupled to the communication interface.

When the communication apparatus is the serving base station, the communication interface may be a transceiver or an input/output interface.

When the communication apparatus is the chip disposed in the serving base station, the communication interface may be an input/output interface.

Optionally, the transceiver may be a transceiver circuit. Optionally, the input/output interface may be an input/output circuit.

According to a ninth aspect, a communication apparatus is provided. The communication apparatus may be the positioning function node in the foregoing method designs, or may be a chip disposed in the positioning function node. The communication apparatus includes a processor that is coupled to a memory, and the processor may be configured to execute instructions in the memory, to implement the method performed by the positioning function node in any one of the third aspect and the possible implementations of the third aspect. Optionally, the communication apparatus further includes the memory. Optionally, the communication apparatus further includes a communication interface, and the processor is coupled to the communication interface.

When the communication apparatus is the positioning function node, the communication interface may be a transceiver or an input/output interface.

When the communication apparatus is the chip disposed in the positioning function node, the communication interface may be an input/output interface.

Optionally, the transceiver may be a transceiver circuit. Optionally, the input/output interface may be an input/output circuit.

According to a tenth aspect, a program is provided. When executed by a processor, the program is used to perform the method according to any one of the first aspect, the second aspect, the third aspect, and the possible implementations of the first aspect, the second aspect, or the third aspect.

According to an eleventh aspect, a program product is provided. The program product includes program code. When the program code is run by a communication unit and a processing unit, or a transceiver and a processor of a communication apparatus (for example, a terminal device), the communication apparatus performs the method according to any one of the first aspect and the possible implementations of the first aspect.

According to a twelfth aspect, a program product is provided. The program product includes program code. When the program code is run by a communication unit and a processing unit, or a transceiver and a processor of a communication apparatus (for example, a serving base station), the communication apparatus performs the method according to any one of the second aspect and the possible implementations of the second aspect.

According to a thirteenth aspect, a program product is provided. The program product includes program code. When the program code is run by a communication unit and a processing unit, or a transceiver and a processor of a communication apparatus (for example, a positioning function node), the communication apparatus performs the method according to any one of the third aspect and the possible implementations of the third aspect.

According to a fourteenth aspect, a computer-readable storage medium is provided. The computer-readable storage medium stores a program, and the program enables a communication apparatus (for example, a terminal device) to perform the method according to any one of the first aspect and the possible implementations of the first aspect.

According to a fifteenth aspect, a computer-readable storage medium is provided. The computer-readable storage medium stores a program, and the program enables a communication apparatus (for example, a serving base station) to perform the method according to any one of the second aspect and the possible implementations of the second aspect.

According to a sixteenth aspect, a computer-readable storage medium is provided. The computer-readable storage medium stores a program, and the program enables a communication apparatus (for example, a positioning function node) to perform the method according to any one of the third aspect and the possible implementations of the third aspect.

DESCRIPTION OF EMBODIMENTS

Figure 1:
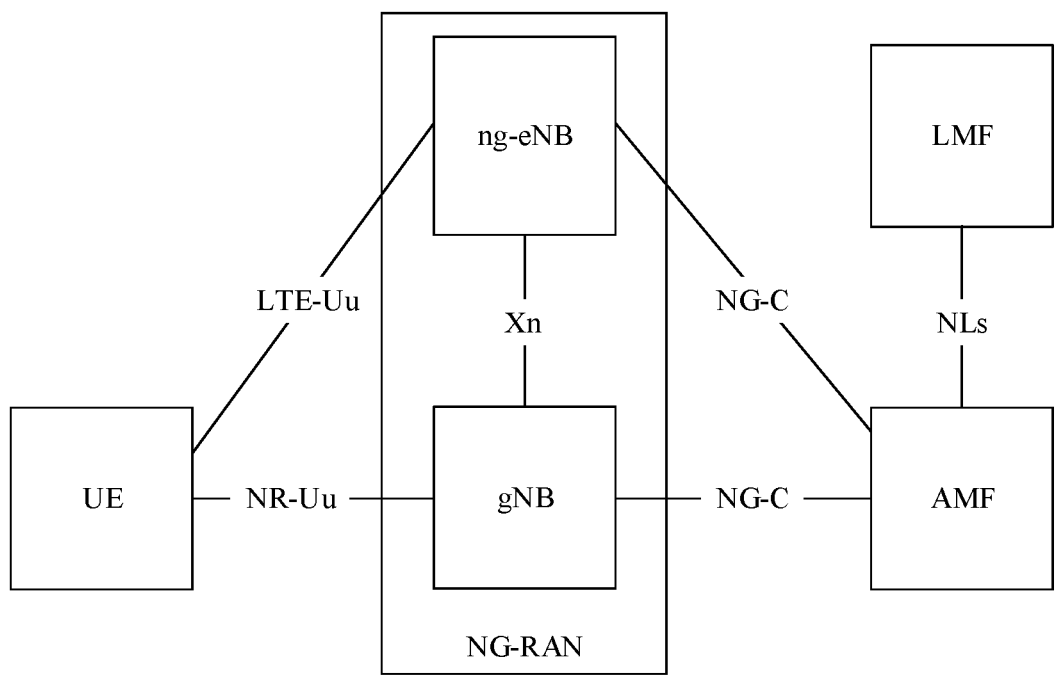
FIG. 1 is a schematic architectural diagram of a positioning system applying signal transmission according to an embodiment of this application.

The following describes this application in detail with reference to accompanying drawings.

Embodiments of this application may be applied to various communication systems such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a function module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), and a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 is a schematic architectural diagram of a positioning system applying signal transmission according to an embodiment of this application. As shown in FIG. 1, in the positioning system, UE is connected to a radio access network through an LTE-Uu interface and/or an NR-Uu interface via a next-generation eNodeB (ng-eNB) and a gNB respectively. The radio access network is connected to a core network through an NG-C interface via an access and mobility management function (AMF). A next-generation radio access network (NG-RAN) includes one or more ng-eNBs. The NG-RAN may also include one or more gNBs. The NG-RAN may alternatively include one or more ng-eNBs and gNBs. The ng-eNB is an LTE base station that accesses a 5G core network, and the gNB is a 5G base station that accesses the 5G core network. The core network includes functions such as the AMF and a location management function (LMF). The AMF is configured to implement functions such as access management, and the LMF is configured to implement functions such as positioning. The AMF and the LMF are connected through an NLs interface. The LMF is an apparatus or a component deployed in the core network to provide a positioning function for the UE.

Figure 2:
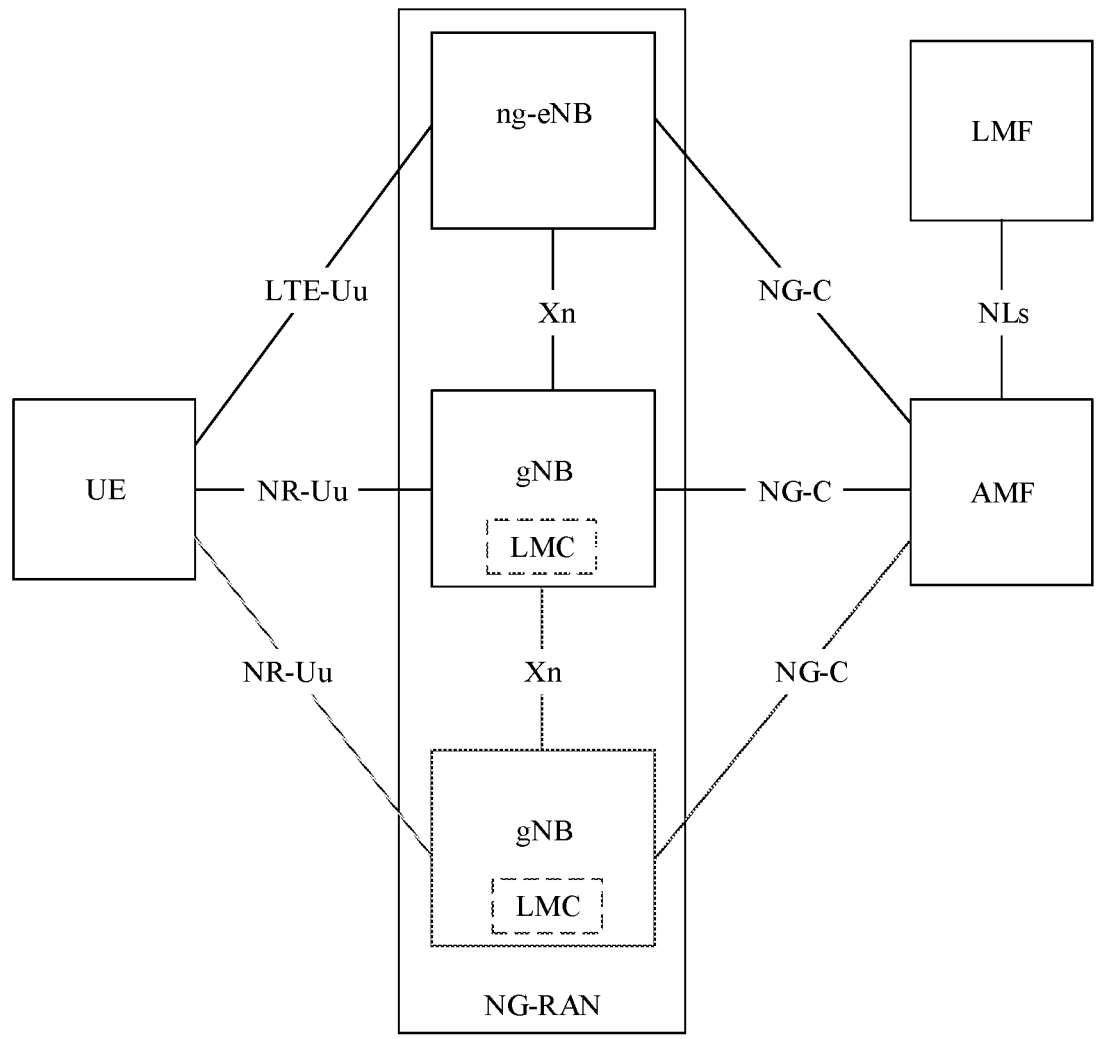
FIG. 2 is a schematic architectural diagram of another positioning system applying signal transmission according to an embodiment of this application.

FIG. 2 is a schematic architectural diagram of another positioning system applying signal transmission according to an embodiment of this application. A difference between architectures of the positioning systems in FIG. 1 and FIG. 2 lies in that a location management apparatus or component (for example, an LMF) in FIG. 1 is deployed in the core network, and a location management apparatus or component (for example, a location management component (LMC)) in FIG. 2 may be deployed in a base station. As shown in FIG. 2, a gNB includes the LMC. The LMC is a component of a part of functions of an LMF and may be integrated into a gNB on an NG-RAN side.

It should be understood that the positioning system in FIG. 1 or FIG. 2 may include one or more gNBs, and one or more UEs. A single gNB may transmit data or control signaling to one or more UEs. A plurality of gNBs may simultaneously transmit data or control signaling to a single UE.

It should be further understood that the devices or the function nodes included in the positioning system in FIG. 1 or FIG. 2 are merely described as an example, and do not constitute a limitation on the embodiments of this application. In practice, the positioning system in FIG. 1 or FIG. 2 may further include another network element, device or function node that has an interaction relationship with the device or function node shown in the figure. This is not specifically limited herein.

For ease of understanding, the following briefly describes some terms or concepts in the embodiments of this application.

Quasi-co-location (QCL) may also be referred to as quasi-colocation. A quasi-co-location relationship is used to indicate that a plurality of resources have one or more same or similar communication features. For the plurality of resources that have the quasi-co-location relationship, a same or similar communication configuration may be used. For example, if two antenna ports have the co-location relationship, large-scale information of a channel over which a symbol on one port is conveyed can be inferred from large-scale information of a channel over which a symbol on the other port is conveyed. For example, that an antenna port of a synchronization signal/physical broadcast channel block (SS/PBCH block) and an antenna port of a physical downlink control channel (PDCCH) demodulation reference signal (DMRS) are QCLed on a spatial receive parameter means that a spatial receive parameter, to be specific, a receive beam direction, used when the PDCCH DMRS is received can be inferred from a spatial receive parameter, to be specific, a receive beam direction, used when UE receives the SS/PBCH block. In other words, the UE may receive the PDCCH DMRS based on an optimal receive beam trained by the SS/PBCH block.

That two reference signals are QCLed on a large-scale parameter means that any antenna port on the 1st reference signal and any antenna port on the 2nd reference signal are QCLed on the large-scale parameter.

Quasi-colocation assumption (QCL assumption): an assumption of whether two ports have a QCL relationship. A Configuration and an indication of the quasi-colocation assumption may be used to help a receive end to receive and demodulate a signal. For example, the receive end can determine that a port A and a port B have the QCL relationship. In other words, a large-scale parameter of a signal measured on the port A may be used for signal measurement and demodulation on the port B.

Beam: a beam is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams with a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It can be understood that the one or more antenna ports forming the beam may alternatively be considered as one antenna port set. In a protocol, the beam can also be embodied as a spatial filter.

In an LTE system, a positioning technology based on an observed time difference of arrival (OTDOA) is standardized in Rel-9. In the positioning technology, a terminal device receives and measures positioning reference signals (PRS) that are sent by a plurality of cells, calculates a measurement quantity such as a reference signal time difference (RSTD), and sends the measurement quantity to an evolved serving mobile location center (E-SMLC). The E-SMLC determines a location of the terminal device based on the received measurement quantity. An LTE positioning requirement is to comply with the law. Specifically, horizontal positioning precision is required to be less than 50 m, and vertical positioning is required to be precise enough to identify a floor.

A positioning requirement in the 5G system or new radio NR system includes a regulatory requirement and a commercial scenario requirement. A regulatory requirement is the same as the LTE positioning requirement. For a commercial scenario, for outdoors, horizontal positioning precision is required to be less than 10 m, and vertical positioning precision is required to be less than 3 m (to be determined); for indoors, horizontal positioning precision is required to be less than 3 m, and vertical positioning precision is required to be less than 3 m (to be determined). Compared with the monotonous requirement in LTE, in 5G not only a plurality of levels of requirements are supported, but the requirement for the business scenario is also more stringent than that in LTE.

An embodiment of this application provides a signal transmission method. A QCL configuration of a positioning reference signal is provided for a terminal device, and the terminal device is assisted in determining a receive beam for the positioning reference signal, so that overheads of performing receive beam sweeping by the terminal device can be reduced. The following describes in detail this embodiment of this application with reference to FIG. 3.

Figure 3:
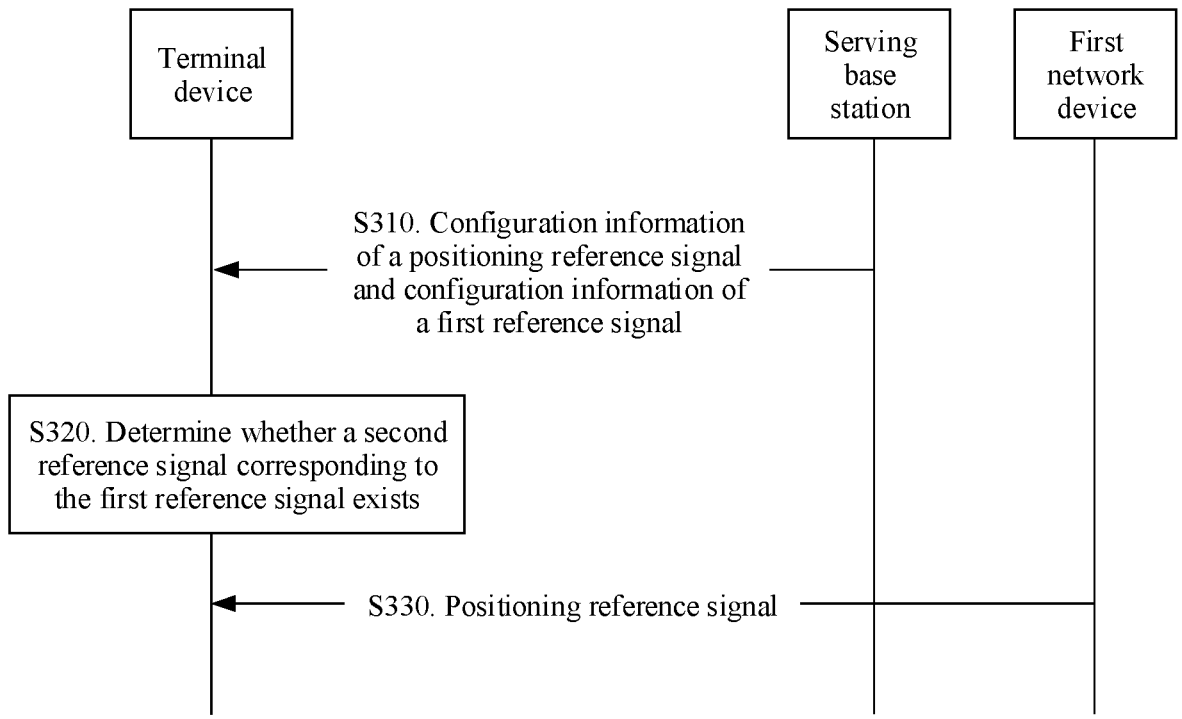
FIG. 3 is a schematic interaction diagram of a signal transmission method according to an embodiment of this application.

FIG. 3 is a schematic flowchart of a signal transmission method 300 according to an embodiment of this application. As shown in FIG. 3, the method 300 includes the following steps.

At step S310, a terminal device receives configuration information of a positioning reference signal and configuration information of a first reference signal that are from a first network device and that are sent by a serving base station, where the first reference signal and the positioning reference signal are quasi-co-located (QCLed), and the first network device is any one of a plurality of devices configured to position the terminal device.

The plurality of devices configured to position the terminal device may be a plurality of base stations. In other words, the first network device may be any base station in the plurality of base stations that participate in positioning. The plurality of base stations participating in positioning may include one or more of the following base stations: the serving base station, a base station in a neighboring cell of the serving base station, and a base station in a non-neighboring cell of the serving base station. This is not specifically limited. For example, the first network device may be a serving base station, or may be a base station in a neighboring cell of the serving base station, or may be a base station in a non-neighboring cell of the serving base station.

Specifically, the serving base station may send the configuration information of the positioning reference signal and the configuration information of the first reference signal that are from the first network device to the terminal device by using a radio resource control (RRC) protocol. Alternatively, if a positioning function node (where a location management function such as an LMF is deployed on the positioning function node) sends the configuration information of the positioning reference signal and the configuration information of the first reference signal that are from the first network device to the terminal device via the serving base station, the sending may be performed by using an LPP protocol.

Herein, if a plurality of first network devices participate in positioning of the terminal device, all of the plurality of network devices participating in positioning of the terminal device, that is, the plurality of first network devices, may report, to the positioning function node, configuration information of positioning reference signals and configuration information of reference signals QCLed with the positioning reference signals.

The positioning function node may send, to the serving base station, the configuration information of the positioning reference signals and the configuration information of the reference signals QCLed with the positioning reference signals that are from the plurality of first network devices. The serving base station or the positioning function node may select, from the configuration information of the positioning reference signals and the configuration information of the reference signals QCLed with the positioning reference signals that are reported by the plurality of first network devices, content reported by some network devices, and send the content to the terminal device. The serving base station may select, according to an indication of the positioning function node, configuration information of positioning reference signals and configuration information of reference signals QCLed with the positioning reference signals that are reported by some of the first network devices, and send the configuration information to the terminal device. The foregoing plurality of sending possibilities are not limited in this application.

It should be understood that each first network device may report configuration information of a plurality of positioning reference signals and configuration information of reference signals QCLed with the positioning reference signals.

Optionally, the configuration information of the positioning reference signal and the configuration information of the first reference signal may be sent by using a same message or a same piece of signaling, or may be sent by using a plurality of messages or a plurality of pieces of signaling. This is not limited in this application.

Optionally, the configuration information of the positioning reference signal may include one or more of the following: a time-frequency resource, a quantity of ports, a periodicity and an offset within the periodicity, and sequence information.

The positioning reference signal in the embodiments of this application refers to a reference signal for positioning the terminal device. It should be understood that, in this application, "reference signals for positioning the terminal device" are collectively denoted as the "positioning reference signal". However, it cannot be understood as that the "positioning reference signal" includes only a positioning reference signal (PRS) dedicated for positioning. Details are not described below. Optionally, the reference signal for positioning the terminal device includes but is not limited to a positioning reference signal PRS, a demodulation reference signal (DMRS), a tracking reference signal (TRS), and a channel state information reference signal (CSI-RS).

Optionally, the first reference signal may be a synchronization/physical broadcast channel block SS/PBCH block, or a channel state information reference signal (CSI-RS), where the SS/PBCH block may also be referred to as a synchronization signal block (SSB).

If the first reference signal is a synchronization signal block (SSB), the configuration information of the first reference signal may include one or more of the following: a subcarrier spacing, a frequency domain resource, a system frame initialization time, a time domain index, a periodicity, and a physical layer cell identifier.

If the first reference signal is a channel state information reference signal (CSI-RS), the configuration information of the positioning reference signal may include one or more of the following: a time-frequency resource, a periodicity and an offset within the periodicity, and sequence information.

A general description is provided herein. In the embodiments of this application, that two reference signals are QCLed means that the two reference signals are QCLed on one or more of the following large-scale parameters: an average delay, a delay spread, a Doppler shift, a Doppler spread, a spatial receive parameter, and an average gain. Specifically, that two reference signals are QCLed on the average delay indicates that average delays of the two reference signals are the same. That two reference signals are QCLed on the delay spread indicates that delay spreads of the two reference signals are the same. That two reference signals are QCLed on the Doppler shift indicates that Doppler shifts of the two reference signals are the same. That two reference signals are QCLed on the Doppler spread indicates that Doppler spreads of the two reference signals are the same. That two reference signals are QCLed on the spatial receive parameter indicates that spatial receive parameters of the two reference signals are the same, in other words, receive beams are the same. That two reference signals are QCLed on the average gain indicates that average gains of the two reference signals are the same.

For example, a large-scale parameter set for QCL may be any one of the following sets: (1) the average delay, the delay spread, the Doppler shift, and the Doppler spread; (2) the average delay and the Doppler shift; (3) the average delay, the delay spread, the Doppler shift, the Doppler spread, and the spatial receive parameter; (4) the average delay, the Doppler shift, and the spatial receive parameter; or (5) the spatial receive parameter.

It should be understood that the foregoing description about two QCLed reference signals is applicable to the first reference signal and the positioning reference signal, and is also applicable to a second reference signal and the positioning reference signal, but is not limited thereto. For any two reference signals that have the QCL relationship, refer to the foregoing description.

At step S320, the terminal device determines, based on the configuration information of the positioning reference signal and the configuration information of the first reference signal, whether a second reference signal corresponding to the first reference signal exists.

Specifically, after obtaining the configuration information of the positioning reference signal and the configuration information of the first reference signal, the terminal device may determine, from a reference signal of a serving cell to which the terminal device belongs, a reference signal of a neighboring cell of the terminal device, or a reference signal configured by the positioning function node for the terminal device, whether the second reference signal corresponding to the first reference signal exists.

That the second reference signal corresponds to the first reference signal may be that a subcarrier spacing corresponding to the second reference signal is the same as that corresponding to the first reference signal, that a time domain resource index corresponding to the second reference signal is the same as that corresponding to the first reference signal, that an RE corresponding to the second reference signal at least partially overlaps with an RE corresponding to the first reference signal, or that the second reference signal and the first reference signal have the QCL relationship. It should be understood that various possible relationships between the second reference signal and the first reference signal provided herein may be properly combined. To be specific, that the second reference signal corresponds to the first reference signal may be one or more of the foregoing possibilities. This is not specifically limited in this embodiment of this application. For example, a subcarrier spacing corresponding to the second reference signal is the same as that corresponding to the first reference signal, and a time domain resource index corresponding to the second reference signal is the same as that corresponding to the first reference signal.

At step S330, if determining that the second reference signal exists, the terminal device receives the positioning reference signal sent by the first network device, where the positioning reference signal and the second reference signal are QCLed.

Alternatively, if determining that the second reference signal does not exist, the terminal device receives the positioning reference signal sent by the first network device.

Herein, each network device participating in positioning may send a positioning reference signal to the terminal device. If one network device participating in positioning reports to the positioning function node in advance, configuration information of a positioning reference signal and configuration information of a reference signal QCLed with the positioning reference signal, and the network device sends the positioning reference signal to the terminal device, the network device also sends, based on the configuration information of the reference signal QCLed with the positioning reference signal, the reference signal QCLed with the positioning reference signal. The reference signal QCLed with the positioning reference signal may be understood as the first reference signal.

Specifically, if the terminal device determines that the second reference signal exists, the positioning reference signal and the second reference signal are QCLed, and a large-scale parameter for QCL includes a spatial receive parameter, the terminal device may receive, by using a receive beam corresponding to the second reference signal, the first reference signal sent by the first network device. Therefore, the receiving does not need to be performed in a beam sweeping manner. This helps reduce overheads of performing receive beam sweeping by the terminal device. If the terminal device determines that the second reference signal does not exist, the terminal device needs to perform beam training on the first reference signal and the positioning reference signal together.

After the terminal device receives the positioning reference signal sent by the first network device, if the positioning reference signal has a corresponding first reference signal, and the terminal device determines that the second reference signal exists, the terminal device may consider that the received positioning reference signal and the second reference signal are QCLed. For example, if a large-scale parameter for QCL includes a spatial receive parameter, the terminal device may form a receive beam based on a beam training result of the second reference signal, and receive the positioning reference signal by using the receive beam. For another example, if a large-scale parameter for QCL includes an average delay, the terminal device may be assisted, based on timing information of the second reference signal, in receiving the positioning reference signal.

Alternatively, after the terminal device receives the positioning reference signal sent by the first network device, if the terminal device cannot determine the second reference signal (that is, the terminal device determines that the second reference signal does not exist), the terminal device may consider that the positioning reference signal and the first reference signal are QCLed.

For example, if a large-scale parameter for QCL includes a spatial receive parameter, the terminal device may form a receive beam based on a beam training result of the first reference signal, and receive the positioning reference signal by using the receive beam. Because the terminal device has not performed beam training on the first reference signal before, the terminal device needs to perform beam training jointly on the first reference signal and the positioning reference signal.

For another example, if a large-scale parameter for QCL includes an average delay, the terminal device may receive the positioning reference signal with auxiliary reception based on timing information of the first reference signal.

Certainly, if the positioning reference signal has no corresponding first reference signal, the terminal device has no QCL assumption for the positioning reference signal.

It should be understood that the embodiments of this application may be applied to the architecture of the positioning system in FIG. 1 or FIG. 2. Certainly, the embodiments of this application may also be applied to a positioning system appropriately changed or modified from the system in FIG. 1 or FIG. 2. This is not specifically limited.

If the positioning system in FIG. 1 is used, for S310, the configuration information of the positioning reference signal and the configuration information of the first reference signal that are from the first network device may be directly sent by the serving base station to the terminal device. Herein, the positioning function node may notify the serving base station to select which network devices for positioning of the terminal device, so that the serving base station sends, to the terminal device, configuration information of a plurality of positioning reference signals and configuration information of a first reference signal corresponding to each positioning reference signal that are from the network devices. In other words, the serving base station may select, according to the indication of the positioning function node, the plurality of devices configured to position the terminal device.

Alternatively, the serving base station may select some network devices for positioning of the terminal device, and send, to the terminal device, configuration information of a plurality of positioning reference signals and configuration information of a first reference signal corresponding to each positioning reference signal that are from the network devices. In the case in which the serving base station performs selection, the serving base station may select, based on signal quality of a neighboring cell, a network device configured to position the terminal device.

If the positioning system in FIG. 2 is used for S310, the configuration information of the positioning reference signal and the configuration information of the first reference signal that are from the first network device may be sent by the positioning function node to the terminal device via the serving base station. Herein, the positioning function node may select some network devices configured to position the terminal device, and then send, to the serving base station, configuration information of a plurality of first positioning reference signals and configuration information of a first reference signal corresponding to each first positioning reference signal that are from the network devices, so that the serving base station forwards the configuration information to the terminal device.

The following separately describes in detail how the terminal device determines the second reference signal.

In a possible implementation, S320 includes: if the positioning reference signal does not belong to the serving cell of the terminal device, the terminal device determines, from a first signal set based on the configuration information of the positioning reference signal and the configuration information of the first reference signal, whether the second reference signal exists.

The first signal set includes one or more of the following: a reference signal of a neighboring cell in a measurement object of the serving cell, a reference signal set of the terminal device configured in the serving cell, and a reference signal configured by the location management function (LMF) for the terminal device.

Specifically, after receiving the configuration information of the positioning reference signal, the terminal device may first determine whether a cell to which the positioning reference signal belongs is the serving cell of the terminal device. If the cell to which the positioning reference signal belongs is not the serving cell of the terminal device, the terminal device needs to determine whether the second reference signal is included in the first signal set.

The reference signal of the neighboring cell in the measurement object of the serving cell may be a set including a synchronization signal block (SSB) and a CSI-RS that are included in all measurement objects, and may correspond to an SS/PBCH block included in ssb-ConfigMobility and a CSI-RS included in csi-rs-ResourceConfigMobility that are configured in all MeasObjectNR in the serving cell. Herein, some reference signals of the neighboring cell are configured in the measurement object for the terminal device to perform mobility measurement.

The reference signal set of the terminal device configured in the serving cell includes: a CSI-RS set configured by the serving base station for the terminal device by using a channel state information measurement configuration CSI-MeasConfig. Herein, interaction between serving base stations may be performed by using the neighboring cell, to configure a CSI-RS of the neighboring cell for the terminal device.

The reference signal configured by the location management function (LMF) for the terminal device may include one or more of the following signals: a CSI-RS, an SS/PBCH block, and a PRS.

If the first reference signal is a synchronization signal block (SSB), the second reference signal is an SSB that is in the first signal set and that meets one or more of the following conditions: having a same subcarrier spacing as the first reference signal, having a resource element completely overlapping with a resource element (RE) corresponding to the first reference signal, and having a same physical layer cell identifier as the first reference signal. In this case, the terminal device determines that the second reference signal is included in the first signal set. For example, the second reference signal and the first reference signal have a same subcarrier spacing, have a same RE set, and have a same physical layer cell identifier.

A general description is provided herein. "The resource element (RE) corresponding to the second reference signal completely overlaps with the resource element (RE) corresponding to the first reference signal" may alternatively be replaced with "the second reference signal and the first reference signal are located on a same frequency". Details are not described below. For example, the second reference signal and the first reference signal have a same subcarrier spacing, are located on a same frequency, and have a same physical layer cell identifier.

Optionally, the terminal device may determine, based on the configuration information of the first reference signal and configuration information of an SSB in the first signal set, an RE set to which the first reference signal and the SSB in the first signal set are mapped.

If the first reference signal is a channel state information reference signal (CSI-RS), the second reference signal is a CSI-RS or an SSB that is in the first signal set and that meets one or more of the following conditions: having a same subcarrier spacing as the first reference signal, having a resource element at least partially overlapping with a resource element (RE) corresponding to the first reference signal, where there is a same sequence on the overlapped RE, having a same physical layer cell identifier as the first reference signal, and having a QCL relationship with the first reference signal. In this case, the terminal device determines that the second reference signal is included in the first signal set. It should be understood that for "having a QCL relationship with the first reference signal" refers to the foregoing description of "two reference signals are QCLed". Details are not described herein again.

For example, the second reference signal is a CSI-RS that is in the first signal set, that has a same subcarrier spacing as the first reference signal and has a resource element at least partially overlaps with a resource element (RE) corresponding to the first reference signal, where there is a same sequence on the overlapped RE.

For another example, the second reference signal is a CSI-RS that is in the first signal set and that has a same subcarrier spacing as the first reference signal, at least partially overlaps with a resource element (RE) corresponding to the first reference signal, where there is a same sequence on the overlapped RE, and has a same physical layer cell identifier as the first reference signal.

For another example, the first reference signal is a CSI-RS, and the second reference signal is an SSB that is in the first signal set and that has a QCL relationship with the first reference signal.

For another example, the first reference signal is a CSI-RS, and the second reference signal is a CSI-RS that is in the first signal set and that has a QCL relationship with the first reference signal.

Therefore, when the cell to which the positioning reference signal belongs is not the serving cell of the terminal device, the terminal device may determine the second reference signal in the foregoing manner.

Optionally, the terminal device may determine, based on the configuration information of the first reference signal and resource configuration information of a CSI-RS in the first signal set, an RE set to which the first reference signal and the CSI-RS resource in the first signal set are mapped.

Optionally, in a possible case, if the cell to which the positioning reference signal belongs is not the serving cell of the terminal device, the terminal device may not be able to determine the second reference signal corresponding to the first reference signal.

In another possible implementation, S320 includes: if the positioning reference signal belongs to the serving cell of the terminal device, the terminal device determines, from at least one reference signal of the serving cell based on the configuration information of the positioning reference signal and the configuration information of the first reference signal, whether the second reference signal exists.

Specifically, after receiving the configuration information of the positioning reference signal, the terminal device may first determine whether the cell to which the positioning reference signal belongs is the serving cell of the terminal device. If the cell to which the positioning reference signal belongs is the serving cell of the terminal device, the terminal device may determine whether the second reference signal is included in the at least one reference signal of the serving cell.

If the first reference signal is a synchronization signal block (SSB), the second reference signal is an SSB that is in the at least one reference signal of the serving cell and that has a same time domain resource index as the first reference signal. In this case, the terminal device determines that the second reference signal is included in the serving cell.

For example, when the first reference signal is an SSB, the terminal device determines, in the serving cell, that an SSB has a same time domain index as the first reference signal. In this case, the terminal device may consider that the second reference signal is included in the serving cell. The SSB having the same time domain index as the first reference signal is the second reference signal.

If the first reference signal is a channel state information reference signal (CSI-RS), the second reference signal is a CSI-RS that is in the first signal set and that meets one or more of the following conditions: having a same subcarrier spacing as the first reference signal, at least partially overlapping with a resource element (RE) corresponding to the first reference signal, where there is a same sequence on the overlapped RE, and having a QCL relationship with the first reference signal. In this case, the terminal device determines that the second reference signal is included in the serving cell.

For example, when the first reference signal is a CSI-RS, the terminal device determines, in a CSI-RS resource set configured by using the CSI-MeasConfig of the serving cell, that a CSI-RS resource that has a same subcarrier spacing as the first reference signal and that has an RE at least partially overlapping with an RE of the first reference signal, where there is a same sequence on the overlapped RE; or determines that a CSI-RS and the first reference signal have a QCL relationship. In this case, the terminal device may consider that the second reference signal is included in the serving cell, and a CSI-RS corresponding to the CSI-RS resource is the second reference signal.

For another example, when the first reference signal is a CSI-RS, the terminal device determines, in an SSB set of the serving cell, that an SSB having a QCL relationship with the first reference signal exists. In this case, the SSB is the second reference signal.

Therefore, when the cell to which the positioning reference signal belongs is the serving cell of the terminal device, the terminal device may determine the second reference signal in the foregoing manner.

Optionally, the method 300 further includes:

the terminal device sends a positioning report to the serving base station, where the positioning report includes a measurement result of the positioning reference signal, where the positioning reference signal meets conditions: the terminal device receives the configuration information of the first reference signal corresponding to the positioning reference signal, and the terminal device has determined that the second reference signal exists; or the positioning reference signal meets conditions: the terminal device receives the configuration information of the first reference signal corresponding to the positioning reference signal, and the second reference signal has not been determined.

Optionally, the positioning report (or referred to as an initial positioning report) may include a reference signal time difference (RSTD), and receiving quality of a reference signal (for example, reference signal received power (RSRP), reference signal received quality (RSRQ), a signal to interference plus noise ratio (SINR), a reference signal strength indicator (RSSI), and the like). The positioning report may further include other information measured by the terminal device, which is not enumerated herein one by one.

Specifically, for a preset frequency range (for example, a frequency range where a frequency is greater than 6 GHz), if the terminal device receives the configuration information of the first reference signal corresponding to the positioning reference signal and determines that the second reference signal exists, the terminal device may send the positioning report to the serving base station. Alternatively, if the terminal device receives the configuration information of the first reference signal corresponding to the positioning reference signal, and does not determine the second reference signal, the terminal device may send the positioning report to the serving base station.

Herein, for a scenario in which the positioning function node is deployed in the core network (corresponding to the positioning system in FIG. 1), the positioning function node may receive the positioning report sent by the terminal device via the serving base station. Specifically, the terminal device sends the positioning report to the serving base station, and the serving base station sends the positioning report to the positioning function node.

It should be understood that the solutions in the embodiments of this application may be properly combined, and the explanation or description of the terms in the embodiments may be cited or explained in the embodiments. This is not limited in this application.

It should be further understood that sequence numbers of the foregoing processes do not mean execution sequences in the embodiments of this application. The execution sequences of the processes is determined based on functions and internal logic of the processes, and is not construed as any limitation on the implementation processes of the embodiments of this application.

The foregoing describes in detail the signal transmission method according to the embodiments of this application with reference to FIG. 1 to FIG. 3. The following describes a signal transmission apparatus according to the embodiments of this application with reference to FIG. 4 to FIG. 9. It should be understood that the features described in the method embodiments are also applicable to the following apparatus embodiments.

Figure 4:
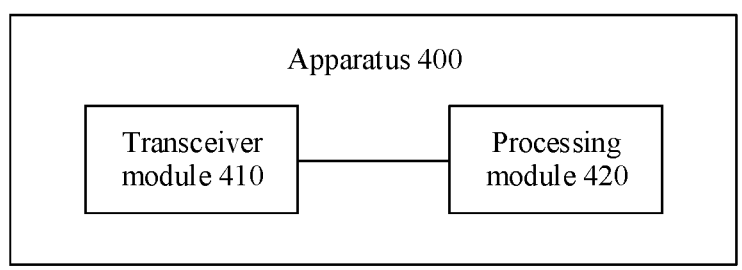
FIG. 4 is a schematic block diagram of a signal transmission apparatus according to an embodiment of this application.

FIG. 4 is a schematic block diagram of a signal transmission apparatus 400 according to an embodiment of this application. The apparatus 400 is configured to perform the method performed by the terminal device in the foregoing method embodiments. Optionally, a specific form of the apparatus 400 may be a terminal device or a chip in the terminal device. This is not limited in this embodiment of this application. The apparatus 400 includes:

a transceiver module 410, configured to receive configuration information of a positioning reference signal and configuration information of a first reference signal that are from a first network device and that are sent by a serving base station, where the first reference signal and the positioning reference signal are quasi-co-located (QCLed), and the first network device is any one of a plurality of devices configured to position a terminal device; and a processing module 420, configured to determine, based on the configuration information of the positioning reference signal and the configuration information of the first reference signal, whether a second reference signal corresponding to the first reference signal exists.

The processing module 420 is further configured to: determine that the second reference signal exists, and invoke the transceiver module 410 to receive the positioning reference signal sent by the first network device, where the positioning reference signal and the second reference signal are QCLed; or determine that the second reference signal does not exist, and invoke the transceiver module 410 to receive the positioning reference signal sent by the first network device.

In an optional implementation, that the processing module 420 is configured to determine, based on the configuration information of the positioning reference signal and the configuration information of the first reference signal, whether a second reference signal corresponding to the first reference signal exists specifically includes:

if the positioning reference signal does not belong to a serving cell of the apparatus, determining, from a first signal set based on the configuration information of the positioning reference signal and the configuration information of the first reference signal, whether the second reference signal exists, where the first signal set includes one or more of the following: a reference signal of a neighboring cell in a measurement object of the serving cell, a reference signal set of the apparatus configured in the serving cell, and a reference signal configured by a location management function (LMF) for the apparatus.

Optionally, the reference signal set of the apparatus configured in the serving cell includes: a CSI-RS set configured by the serving base station for the apparatus by using a channel state information measurement configuration CSI-MeasConfig.

In an optional implementation, that the processing module 420 is configured to determine that the second reference signal is included in the first signal set includes:

if the first reference signal is a synchronization signal block (SSB), the second reference signal is an SSB that is in the first signal set and that meets one or more of the following conditions: having a same subcarrier spacing as the first reference signal, having a resource element completely overlapping with a resource element (RE) corresponding to the first reference signal, and having a same physical layer cell identifier as the first reference signal.

In an optional implementation, that the processing module 420 is configured to determine that the second reference signal is included in the first signal set includes:

if the first reference signal is a channel state information reference signal (CSI-RS), the second reference signal is a CSI-RS that is in the first signal set and that meets one or more of the following conditions or a synchronization signal block (SSB) that is in the first signal set and that meets one or more of the following conditions: having a same subcarrier spacing as the first reference signal, having a resource element at least partially overlapping with a resource element (RE) corresponding to the first reference signal, where there is a same sequence on the overlapped RE, having a same physical layer cell identifier as the first reference signal, and having a QCL relationship with the first reference signal.

In an optional implementation, that the processing module 420 is configured to determine, based on the configuration information of the positioning reference signal and the configuration information of the first reference signal, whether a second reference signal corresponding to the first reference signal exists specifically includes:

if the positioning reference signal belongs to a serving cell of the terminal device, determining, based on the configuration information of the positioning reference signal and the configuration information of the first reference signal, whether the second reference signal is included in at least one reference signal of the serving cell.

Optionally, that the processing module 420 is configured to determine that the second reference signal is included in at least one reference signal of the serving cell includes:

if the first reference signal is a synchronization signal block (SSB), the second reference signal is an SSB that is in the at least one reference signal of the serving cell and that has the same time domain resource index as the first reference signal.

Optionally, that the processing module 420 is configured to determine that the second reference signal is included in at least one reference signal of the serving cell includes:

if the first reference signal is a channel state information reference signal (CSI-RS), the second reference signal is a CSI-RS that is in the first signal set and that meets one or more of the following conditions or a synchronization signal block that is in the first signal set and that meets one or more of the following conditions: having a same subcarrier spacing as the first reference signal, having a resource element at least partially overlapping with a resource element (RE) corresponding to the first reference signal, where there is a same sequence on the overlapped RE, and having a QCL relationship with the first reference signal.

Optionally, the configuration information of the positioning reference signal and the configuration information of the first reference signal are sent by a positioning function node to the apparatus via the serving base station.

In an optional implementation, the transceiver module 410 is further configured to:

send a positioning report to the serving base station, where the positioning report includes a measurement result of the positioning reference signal, where the positioning reference signal meets a condition: the apparatus receives the configuration information of the first reference signal corresponding to the positioning reference signal, and the apparatus has determined that the second reference signal exists; or the positioning reference signal meets a condition: the apparatus receives the configuration information of the first reference signal corresponding to the positioning reference signal, and the second reference signal has not been determined.

It should be understood that the data transmission apparatus 400 according to this embodiment of this application may correspond to the method performed by the terminal device in the foregoing method embodiments, for example, the method in FIG. 4. In addition, the foregoing and other management operations and/or functions of the modules in the apparatus 400 are separately used to implement corresponding steps of the method performed by the terminal device in the foregoing method embodiments, and therefore, can also achieve the beneficial effects in the foregoing method embodiments. For brevity, details are not described herein again.

It should further be understood that the modules in the apparatus 400 may be implemented in a form of software and/or hardware. This is not specifically limited. In other words, the apparatus 400 is presented in a form of function modules. The "module" herein may be an application-specific integrated circuit (ASIC), a circuit, a processor that executes one or more software or firmware programs and a memory, an integrated logic circuit, and/or another component that can provide the foregoing functions. Optionally, in an exemplary embodiment, the apparatus 400 may be in a form shown in FIG. 5. The processing module 420 may be implemented by using a processor 501 shown in FIG. 5. The transceiver module 410 may be implemented by using a transceiver 503 shown in FIG. 5. Specifically, the processor is implemented by executing a computer program stored in the memory. Optionally, when the apparatus 400 is a chip, a function and/or an implementation process of the transceiver module 410 may be alternatively implemented by using a pin, a circuit, or the like. Optionally, the memory is a storage unit in the chip, for example, a register or a cache. The storage unit may alternatively be a storage unit, such as the memory 502 shown in FIG. 5, that is in the computer device and that is located outside the chip.

For hardware implementation, the transceiver module 410 may be a transceiver, and the transceiver 410 (in FIG. 4, the transceiver module 410 is used as an example) constitutes a communication interface in a communication unit.

Figure 5:
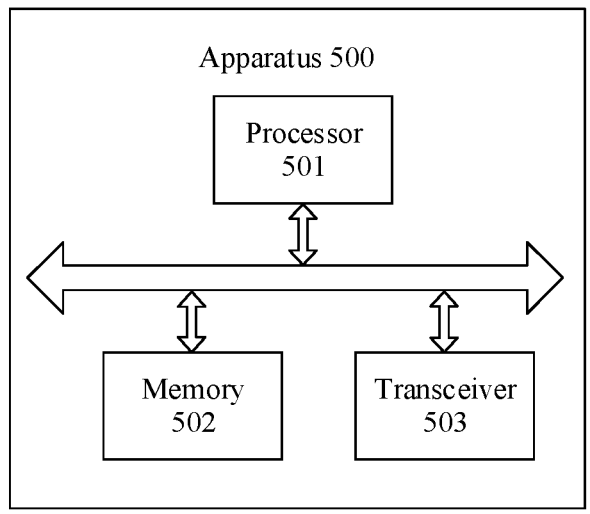
FIG. 5 is a schematic structural diagram of a signal transmission apparatus according to an embodiment of this application.

FIG. 5 is a schematic structural block diagram of a signal transmission apparatus 500 according to an embodiment of this application. As shown in FIG. 5, the apparatus 500 includes a processor 501, and the processor 501 is configured to control and manage an action of a terminal device.

In a possible implementation, the processor 501 is configured to invoke an interface to perform the following action: receiving configuration information of positioning reference signal and configuration information of a first reference signal that are sent by a serving base station, where the first reference signal and the positioning reference signal are quasi-co-located (QCLed), and the first network device is any one of a plurality of devices configured to position the terminal device. The processor 501 is further configured to determine, based on the configuration information of the positioning reference signal and the configuration information of the first reference signal, whether a second reference signal corresponding to the first reference signal exists. The processor 501 determines that the second reference signal exists, and invokes an interface to receive the positioning reference signal sent by the first network device, where the positioning reference signal and the second reference signal are QCLed. Alternatively, the processor 501 determines that the second reference signal does not exist, and invokes an interface to receive the positioning reference signal sent by the first network device.

It should be understood that the processor 501 may invoke the interface to perform the foregoing receiving and sending actions. The invoked interface may be a logical interface or a physical interface. This is not limited. Optionally, the physical interface may be implemented by a transceiver. Optionally, the apparatus 500 further includes the transceiver 503.

Optionally, the apparatus 500 further includes the memory 502, and the memory 502 may store program code in the foregoing method embodiments, so that the processor 501 invokes the program code. The memory 502 may be coupled to or not coupled to the processor 501.

Specifically, if the apparatus 500 includes the processor 501, the memory 502, and the transceiver 503, the processor 501, the memory 502, and the transceiver 503 communicate with each other through an inner connection path, to transmit a control signal and/or a data signal. In a possible design, the processor 501, the memory 502, and the transceiver 503 may be implemented by using a chip. The processor 501, the memory 502, and the transceiver 503 may be implemented in a same chip, or may be separately implemented in different chips, or functions of any two of the processor 501, the memory 502, and the transceiver 503 are implemented in one chip. The memory 502 may store the program code, and the processor 501 invokes the program code stored in the memory 502, to implement a corresponding function of the apparatus 500. It should be understood that the apparatus 500 may be further configured to perform other steps and/or operations on the terminal device side in the foregoing embodiments. For brevity, details are not described herein.

Figure 6:
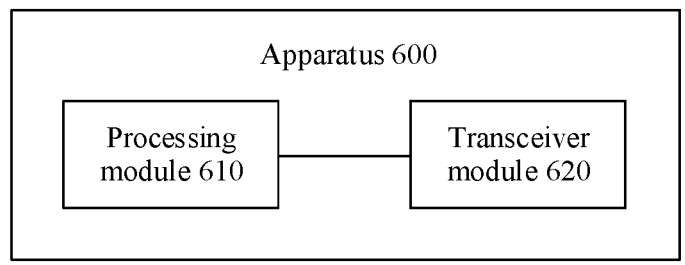
FIG. 6 is a schematic block diagram of a signal transmission apparatus according to another embodiment of this application.

FIG. 6 is a schematic block diagram of a signal transmission apparatus 600 according to an embodiment of this application. The apparatus 600 is configured to perform the method performed by the serving base station side in the foregoing method embodiments. Optionally, a specific form of the apparatus 600 may be the serving base station or a chip in the serving base station. This is not limited in this embodiment of this application. The apparatus 600 includes:

a processing module 610, configured to determine a plurality of devices configured to position a terminal device; and a transceiver module 620, configured to send, to the terminal device, configuration information of a positioning reference signal and configuration information of a first reference signal that are from a first network device, where the first reference signal and the positioning reference signal are quasi-co-located (QCLed), and the first network device is any one of the plurality of devices configured to position the terminal device.

In an optional implementation, the transceiver module 620 is further configured to receive a positioning report sent by the terminal device.

In an optional implementation, the transceiver module 620 is further configured to send the positioning report to the positioning function node.

In an optional implementation, that the processing module 610 is configured to determine a plurality of devices configured to position a terminal device includes:

selecting, according to an indication of the positioning function node, the plurality of devices configured to position the terminal device.

Optionally, the configuration information of the positioning reference signal includes one or more of the following: a time-frequency resource, a quantity of ports, a periodicity and an offset within the periodicity, and sequence information.

Optionally, if the first reference signal is a synchronization signal block (SSB), the configuration information of the first reference signal includes one or more of the following: a frequency domain resource, a system frame initialization time, a time domain index, a periodicity, and a physical layer cell identifier.

If the first reference signal is a channel state information reference signal (CSI-RS), the configuration information of the positioning reference signal includes one or more of the following: a time-frequency resource, a periodicity and an offset within the periodicity, and sequence information.

It should be understood that the signal transmission apparatus 600 according to this embodiment of this application may correspond to the method performed by the serving base station in the foregoing method embodiments, for example, the method in FIG. 6. In addition, the foregoing and other management operations and/or functions of the modules in the apparatus 600 are separately used to implement corresponding steps of the method performed by the serving base station in the foregoing method embodiments, and therefore, can also achieve the beneficial effects in the foregoing method embodiments. For brevity, details are not described herein again.

It should further be understood that the modules in the apparatus 600 may be implemented in a form of software and/or hardware. This is not specifically limited. In other words, the apparatus 600 is presented in a form of function modules. The "module" herein may be an application-specific integrated circuit (ASIC), a circuit, a processor that executes one or more software or firmware programs and a memory, an integrated logic circuit, and/or another component that can provide the foregoing functions. Optionally, in an exemplary embodiment, the apparatus 600 may be in a form shown in FIG. 7. The processing module 610 may be implemented by using a processor 701 shown in FIG. 7. The transceiver module 620 may be implemented by using a transceiver 703 shown in FIG. 7. Specifically, the processor is implemented by executing a computer program stored in the memory. Optionally, when the apparatus 600 is a chip, a function and/or an implementation process of the transceiver module 620 may be alternatively implemented by using a pin, a circuit, or the like. Optionally, the memory is a storage unit in the chip, for example, a register or a cache. The storage unit may alternatively be a storage unit, such as the memory 702 shown in FIG. 7, that is in the computer device and that is located outside the chip.

For hardware implementation, the transceiver module 620 may be a transceiver, and the transceiver 620 (in FIG. 6, the transceiver module 620 is used as an example) constitutes a communication interface in a communication unit.

Figure 7:
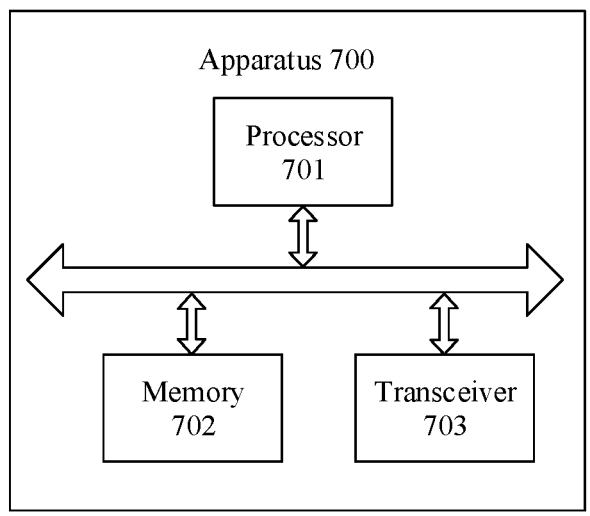
FIG. 7 is a schematic structural diagram of a signal transmission apparatus according to another embodiment of this application.

FIG. 7 is a schematic structural block diagram of a signal transmission apparatus 700 according to an embodiment of this application. As shown in FIG. 7, the apparatus 700 includes a processor 701, and the processor 701 is configured to control and manage an action of a serving base station.

In a possible implementation, the processor 701 is configured to determine a plurality of devices configured to position a terminal device. The processor 701 is further configured to invoke an interface to perform the following action: sending, to the terminal device, configuration information of a positioning reference signal and configuration information of a first reference signal that are from a first network device, where the first reference signal and the positioning reference signal are quasi-co-located (QCLed), and the first network device is any one of the plurality of devices configured to position the terminal device.

It should be understood that the processor 701 may invoke the interface to perform the foregoing receiving and sending actions. The invoked interface may be a logical interface or a physical interface. This is not limited. Optionally, the physical interface may be implemented by a transceiver. Optionally, the apparatus 700 further includes the transceiver 703.

Optionally, the apparatus 700 further includes the memory 702, and the memory 702 may store program code in the foregoing method embodiments, so that the processor 701 invokes the program code. The memory 702 may be coupled to or not coupled to the processor 701.

Specifically, if the apparatus 700 includes the processor 701, the memory 702, and the transceiver 703, the processor 701, the memory 702, and the transceiver 703 communicate with each other through an inner connection path, to transmit a control signal and/or a data signal. In a possible design, the processor 701, the memory 702, and the transceiver 703 may be implemented by using a chip. The processor 701, the memory 702, and the transceiver 703 may be implemented in a same chip, or may be separately implemented in different chips, or functions of any two of the processor 701, the memory 702, and the transceiver 703 are implemented in one chip. The memory 702 may store the program code, and the processor 701 invokes the program code stored in the memory 702, to implement a corresponding function of the apparatus 700.

It should be understood that the apparatus 700 may be further configured to perform other steps and/or operations on the serving base station side in the foregoing embodiments. For brevity, details are not described herein.

Figure 8:
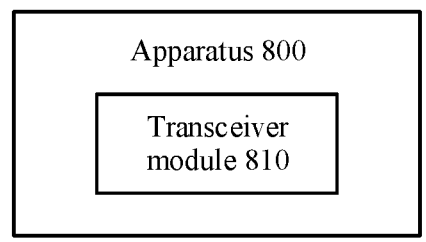
FIG. 8 is a schematic block diagram of a signal transmission apparatus according to still another embodiment of this application.

FIG. 8 is a schematic block diagram of a signal transmission apparatus 800 according to an embodiment of this application. The apparatus 800 is configured to perform the method performed by the positioning function node in the foregoing method embodiments. Optionally, a specific form of the apparatus 800 may be a positioning function node or a chip in the positioning function node. This is not limited in this embodiment of this application. The apparatus 800 includes:

a transceiver module 810, configured to receive configuration information of a positioning reference signal and configuration information of a first reference signal that are reported by a first network device, where the first reference signal and the positioning reference signal are quasi-co-located (QCLed), and the first network device is any one of a plurality of devices configured to position the terminal device, where the transceiver module 810 is further configured to send the configuration information of the positioning reference signal and the configuration information of the first reference signal to a serving base station.

In an optional implementation, the transceiver module 810 is further configured to:

receive a positioning report sent by the serving base station.

In an optional implementation, the transceiver module 810 is further configured to:

the positioning function node sends, to the serving base station, configuration information of a positioning reference signal of each network device in a plurality of network devices and configuration information of a reference signal QCLed with the positioning reference signal.

Optionally, the configuration information of the positioning reference signal includes one or more of the following: a time-frequency resource, a quantity of ports, a periodicity and an offset within the periodicity, and sequence information.

Optionally, if the first reference signal is a synchronization signal block (SSB), the configuration information of the first reference signal includes one or more of the following: a frequency domain resource, a system frame initialization time, a time domain index, a periodicity, and a physical layer cell identifier.

If the first reference signal is a channel state information reference signal (CSI-RS), the configuration information of the positioning reference signal includes one or more of the following: a time-frequency resource, a periodicity and an offset within the periodicity, and sequence information.

It should be understood that the data transmission apparatus 800 according to this embodiment of this application may correspond to the method performed by the positioning function node in the foregoing method embodiments, for example, the method in FIG. 8. In addition, the foregoing and other management operations and/or functions of the modules in the apparatus 800 are separately used to implement corresponding steps of the method performed by the positioning function node in the foregoing method embodiments, and therefore, can also achieve the beneficial effects in the foregoing method embodiments. For brevity, details are not described herein again.

It should further be understood that the modules in the apparatus 800 may be implemented in a form of software and/or hardware. This is not specifically limited. In other words, the apparatus 800 is presented in a form of function modules. The "module" herein may be an application-specific integrated circuit (ASIC), a circuit, a processor that executes one or more software or firmware programs and a memory, an integrated logic circuit, and/or another component that can provide the foregoing functions. Optionally, in an exemplary embodiment, the apparatus 800 may be in a form shown in FIG. 9. The transceiver module 810 may be implemented by using a transceiver 903 shown in FIG. 9. Specifically, the processor is implemented by executing a computer program stored in the memory. Optionally, when the apparatus 800 is a chip, a function and/or an implementation process of the transceiver module 810 may be alternatively implemented by using a pin, a circuit, or the like. Optionally, the memory is a storage unit in the chip, for example, a register or a cache. The storage unit may alternatively be a storage unit, such as the memory 902 shown in FIG. 9, that is in the computer device and that is located outside the chip.

For hardware implementation, the transceiver module 810 may be a transceiver, and the transceiver 810 (in FIG. 8, the transceiver module 810 is used as an example) constitutes a communication interface in a communication unit.

Figure 9:
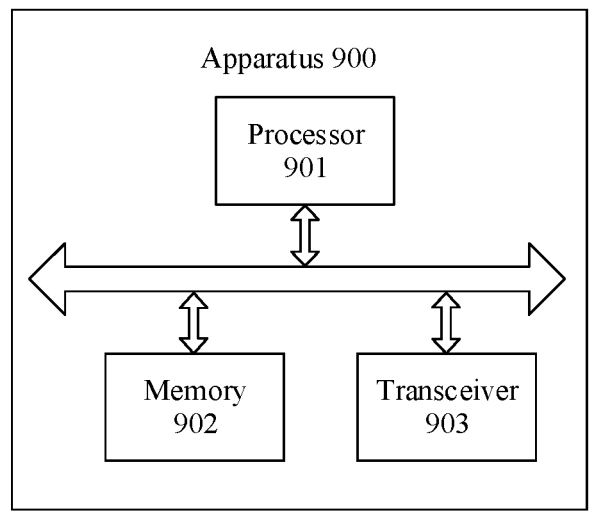
FIG. 9 is a schematic structural diagram of a signal transmission apparatus according to still another embodiment of this application.

FIG. 9 is a schematic structural block diagram of a signal transmission apparatus 900 according to an embodiment of this application. As shown in FIG. 9, the apparatus 900 includes a processor 901, and the processor 901 is configured to control and manage an action of the positioning function node.

In a possible implementation, the processor 901 is configured to invoke an interface to perform the following action: receiving configuration information of a positioning reference signal and configuration information of a first reference signal that are from a first network device and that are reported by a terminal device, where the first reference signal and the positioning reference signal are quasi-co-located (QCLed), and the first network device is any one of the plurality of devices configured to position the terminal device; and sending the configuration information of the positioning reference signal and the configuration information of the first reference signal to a serving base station.

It should be understood that the processor 901 may invoke the interface to perform the foregoing receiving and sending actions. The invoked interface may be a logical interface or a physical interface. This is not limited. Optionally, the physical interface may be implemented by a transceiver. Optionally, the apparatus 900 further includes the transceiver 903.

Optionally, the apparatus 900 further includes the memory 902, and the memory 902 may store program code in the foregoing method embodiments, so that the processor 901 invokes the program code. The memory 902 may be coupled to or not coupled to the processor 901.

Specifically, if the apparatus 900 includes the processor 901, the memory 902, and the transceiver 903, the processor 901, the memory 902, and the transceiver 903 communicate with each other through an inner connection path, to transmit a control signal and/or a data signal. In a possible design, the processor 901, the memory 902, and the transceiver 903 may be implemented by using a chip. The processor 901, the memory 902, and the transceiver 903 may be implemented in a same chip, or may be separately implemented in different chips, or functions of any two of the processor 901, the memory 902, and the transceiver 903 are implemented in one chip. The memory 902 may store the program code, and the processor 901 invokes the program code stored in the memory 902, to implement a corresponding function of the apparatus 900.

It should be understood that the apparatus 900 may be further configured to perform other steps and/or operations on the positioning function node side in the foregoing embodiments. For brevity, details are not described herein.

The method disclosed in the embodiments of this application may be applied to a processor or may be implemented by a processor. The processor may be an integrated circuit chip and has a signal processing capability. In an implementation process, steps in the foregoing method embodiments can be implemented by using a hardware integrated logic circuit in the processor, or by using instructions in a form of software.

The processor may be a general-purpose processor, a digital signal processor (DSP), an application-specific integrated circuit (ASIC), a field programmable gate array (FPGA) or another programmable logic device, a discrete gate, a transistor logic device, a discrete hardware component, a system on chip (SoC), a central processing unit (CPU), a network processor (NP), a digital signal processing circuit (DSP), a micro controller unit (MCU), a programmable controller (PLD), or another integrated chip. It may implement or perform the methods, the steps, and logical block diagrams that are disclosed in the embodiments of this application. The general purpose processor may be a microprocessor, or the processor may be any conventional processor or the like. The steps of the methods disclosed with reference to the embodiments of this application may be directly performed and completed by a hardware decoding processor, or may be performed and completed by a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the systems and methods described in this specification include but are not limited to these memories and any memory of another suitable type.

It should be understood that in the embodiments of the present application, numbers "first", "second", and the like are merely used to distinguish between different objects, for example, to distinguish between different reference signals, and do not constitute a limitation on the scope of the embodiments of this application. The embodiments of this application are not limited thereto.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Different methods may be used to implement the described functions for each particular application, but it should not be considered that such an implementation goes out of the scope of this application.

For convenient and brief description, for a detailed working process of the foregoing system, apparatus, and unit, refer to the corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the embodiments of this application essentially, or the part contributing to the conventional technology, or some of the embodiments may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing description is merely specific implementations of this application, but are not intended to limit the protection scope of this application. Any variations or replacements within the scope disclosed in this application shall fall within the protection scope of this application. Therefore, the protection scope of this application shall be subject to the protection scope of the claims.

What is claimed is:

1. A signal transmission method, comprising:
receiving, by a terminal device, from a serving base station, configuration information of a positioning reference signal of a first network device and configuration information of a first reference signal of the first network device, wherein the first reference signal and the positioning reference signal are quasi-co-located (QCLed), and the first network device is one of a plurality of devices configured to position the terminal device; and
based on a second reference signal corresponding to the first reference signal, determining that the positioning reference signal and the second reference signal are QCLed and receiving, by the terminal device, based on the positioning reference signal and the second reference signal being QCLed, the positioning reference signal from the first network device in accordance with the second reference signal.

2. The method according to claim 1, wherein the method further comprises:
responsive to the positioning reference signal not belonging to a serving cell of the terminal device, determining, by the terminal device from a first signal set based on the configuration information of the positioning reference signal and the configuration information of the first reference signal, whether the second reference signal exists, wherein the first signal set comprises at least one of:
a reference signal of a neighboring cell in a measurement object of the serving cell,
a reference signal set of the terminal device configured in the serving cell, or
a reference signal configured by a location management function (LMF) for the terminal device.

3. The method according to claim 2, wherein determining, from the first signal set, that the second reference signal exists comprises:
responsive to the first reference signal being a synchronization signal block (SSB), determining that the second reference signal is an SSB that is in the first signal set and that meets at least one of the following conditions:
having a same subcarrier spacing as the first reference signal,
having a resource element (RE) completely overlapping with an RE corresponding to the first reference signal, or
having a same physical layer cell identifier as the first reference signal.

4. The method according to claim 1, wherein the method further comprises:
responsive to the positioning reference signal belonging to a serving cell of the terminal device, determining, by the terminal device based on the configuration information of the positioning reference signal and the configuration information of the first reference signal, whether the second reference signal is included in at least one reference signal of the serving cell.

5. The method according to claim 4, wherein determining that the second reference signal is included in the at least one reference signal of the serving cell comprises:
responsive to the first reference signal being a synchronization signal block (SSB), determining that the second reference signal is an SSB that is in the at least one reference signal of the serving cell and that has a same time domain resource index as the first reference signal.

6. The method according to claim 1, wherein the configuration information of the positioning reference signal and the configuration information of the first reference signal are sent by a positioning function node to the terminal device via the serving base station.

7. A signal transmission apparatus, comprising:
a transceiver configured to receive, from a serving base station, configuration information of a positioning reference signal of a first network device and configuration information of a first reference signal of the first network device, wherein the first reference signal and the positioning reference signal are quasi-co-located (QCLed), and the first network device is one of a plurality of devices configured to position a terminal device; and a processor configured to determine that the positioning reference signal and the second reference signal are QCLed and cause the transceiver to receive, based on the positioning reference signal and the second reference signal being QCLed, the positioning reference signal from the first network device in accordance with the second reference signal.

8. The apparatus according to claim 7, wherein the processor is further configured to:
responsive to the positioning reference signal not belonging to a serving cell of the apparatus, determine, from a first signal set based on the configuration information of the positioning reference signal and the configuration information of the first reference signal, whether the second reference signal exists, wherein the first signal set comprises at least one of:
a reference signal of a neighboring cell in a measurement object of the serving cell,
a reference signal set of the apparatus configured in the serving cell, or
a reference signal configured by a location management function (LMF) for the apparatus.

9. The apparatus according to claim 8, wherein determining, from the first signal set, that the second reference signal exists comprises:
responsive to the first reference signal being a synchronization signal block (SSB), determining that the second reference signal is an SSB that is in the first signal set and that meets at least one of the following conditions:
having a same subcarrier spacing as the first reference signal,
having a resource element (RE) completely overlapping with an RE corresponding to the first reference signal, or
having a same physical layer cell identifier as the first reference signal.

10. The apparatus according to claim 7, wherein the processor is further configured to:
responsive to the positioning reference signal belonging to a serving cell of the terminal device, determine, based on the configuration information of the positioning reference signal and the configuration information of the first reference signal, whether the second reference signal is included in at least one reference signal of the serving cell.

11. The apparatus according to claim 10, wherein determining that the second reference signal is included in the at least one reference signal of the serving cell comprises:
responsive to the first reference signal being a synchronization signal block (SSB), determining that the second reference signal is an SSB that is in the at least one reference signal of the serving cell and that has a same time domain resource index as the first reference signal.

12. The apparatus according to claim 7, wherein the configuration information of the positioning reference signal and the configuration information of the first reference signal are sent by a positioning function node to the apparatus via the serving base station.

13. A non-transitory computer-readable storage medium, wherein the computer-readable storage medium stores instructions, which when executed by one or more processors of a terminal device, cause the one or more processors to perform a signal transmission method comprising:
receiving configuration information of a positioning reference signal of a first network device and configuration information of a first reference signal of the first network device from a serving base station, wherein the first reference signal and the positioning reference signal are quasi-co-located (QCLed), and the first network device is one of a plurality of devices configured to position the terminal device; and
determining that the positioning reference signal and the second reference signal are QCLed and receiving, based on the positioning reference signal and the second reference signal being QCLed, the positioning reference signal from the first network device in accordance with the second reference signal.

14. The non-transitory computer-readable storage medium according to claim 13, wherein the method further comprises:
responsive to the positioning reference signal not belonging to a serving cell of the terminal device, determining, from a first signal set based on the configuration information of the positioning reference signal and the configuration information of the first reference signal, whether the second reference signal exists, wherein the first signal set comprises at least one of:
a reference signal of a neighboring cell in a measurement object of the serving cell,
a reference signal set of the terminal device configured in the serving cell, or
a reference signal configured by a location management function (LMF) for the terminal device.

15. The non-transitory computer-readable storage medium according to claim 14, wherein determining, from the first signal set, that the second reference signal exists comprises:
responsive to the first reference signal being a synchronization signal block (SSB), determining that the second reference signal is an SSB that is in the first signal set and that meets at least one of the following conditions:
having a same subcarrier spacing as the first reference signal,
having a resource element (RE) completely overlapping with an RE corresponding to the first reference signal, or
having a same physical layer cell identifier as the first reference signal.

16. The non-transitory computer-readable storage medium according to claim 13, wherein method further comprises:
responsive to the positioning reference signal belonging to a serving cell of the terminal device, determining, based on the configuration information of the positioning reference signal and the configuration information of the first reference signal, whether the second reference signal is included in at least one reference signal of the serving cell.

17. The non-transitory computer-readable storage medium according to claim 16, wherein determining that the second reference signal is included in the at least one reference signal of the serving cell comprises:
responsive to the first reference signal being a synchronization signal block (SSB), determining that the second reference signal is an SSB that is in the at least one reference signal of the serving cell and that has a same time domain resource index as the first reference signal.

18. The non-transitory computer-readable storage medium according to claim 13, wherein the configuration information of the positioning reference signal and the configuration information of the first reference signal are sent by a positioning function node to the terminal device via the serving base station.

19. The method according to claim 1, further comprising:
prior to determining that the positioning reference signal and the second reference signal are QCLed, determining, by the terminal device, based on the configuration information of the positioning reference signal and the configuration information of the first reference signal, whether the second reference signal exists.

20. The apparatus according to claim 7, wherein the processor is further configured to:
prior to determining that the positioning reference signal and the second reference signal are QCLed, determine, based on the configuration information of the positioning reference signal and the configuration information of the first reference signal, whether the second reference signal exists.

* * * * *

UNITED STATES PATENT AND TRADEMARK OFFICE
CERTIFICATE OF CORRECTION

PATENT NO. : 12,021,775 B2
APPLICATION NO. : 17/390569
DATED : June 25, 2024
INVENTOR(S) : Huang et al.

Page 1 of 1

It is certified that error appears in the above-identified patent and that said Letters Patent is hereby corrected as shown below:

In the Claims

Claim 16: Column 32, Line 47: reads as "medium according to claim 13, wherein method further" should read as -- medium according to claim 13, wherein the method further --.

Signed and Sealed this
Twenty-second Day of April, 2025

Coke Morgan Stewart
*Acting Director of the United States Patent and Trademark Office*